April 29, 1958     O. A. PARSONS     2,832,498
RECEPTACLE
Filed Jan. 26, 1955     2 Sheets-Sheet 1
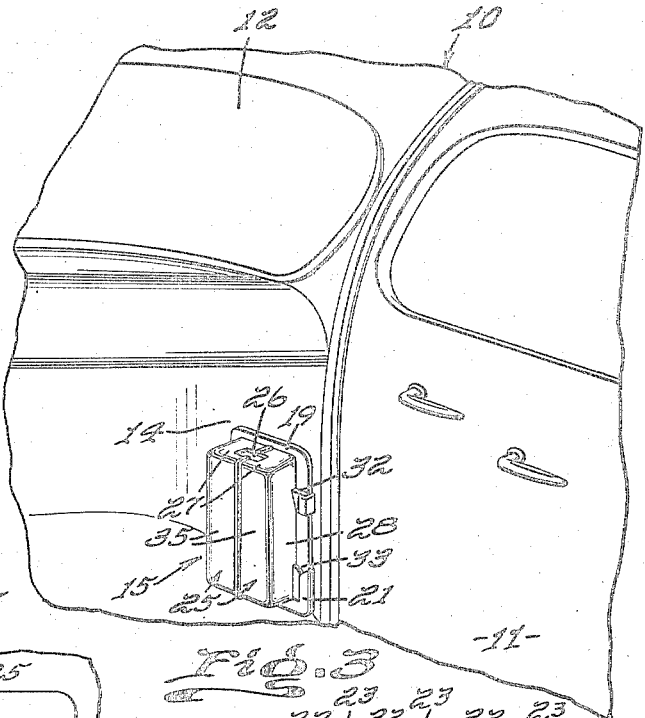
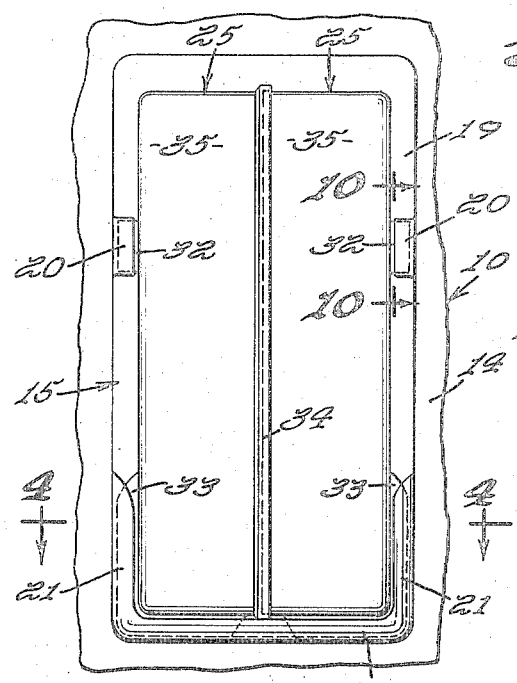
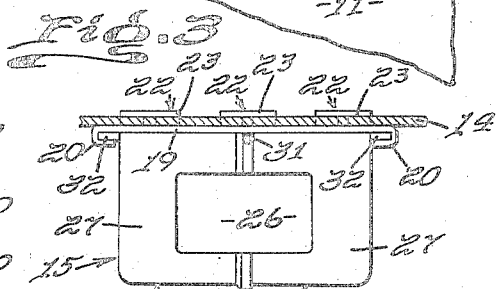
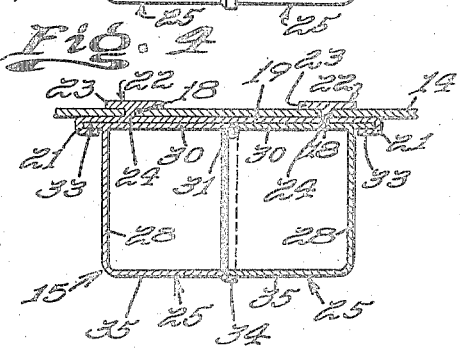
INVENTOR.
Oswand A. Parsons
BY Victor J. Evans & Co.
ATTORNEYS April 29, 1958     O. A. PARSONS     2,832,498
RECEPTACLE
Filed Jan. 26, 1955     2 Sheets-Sheet 2
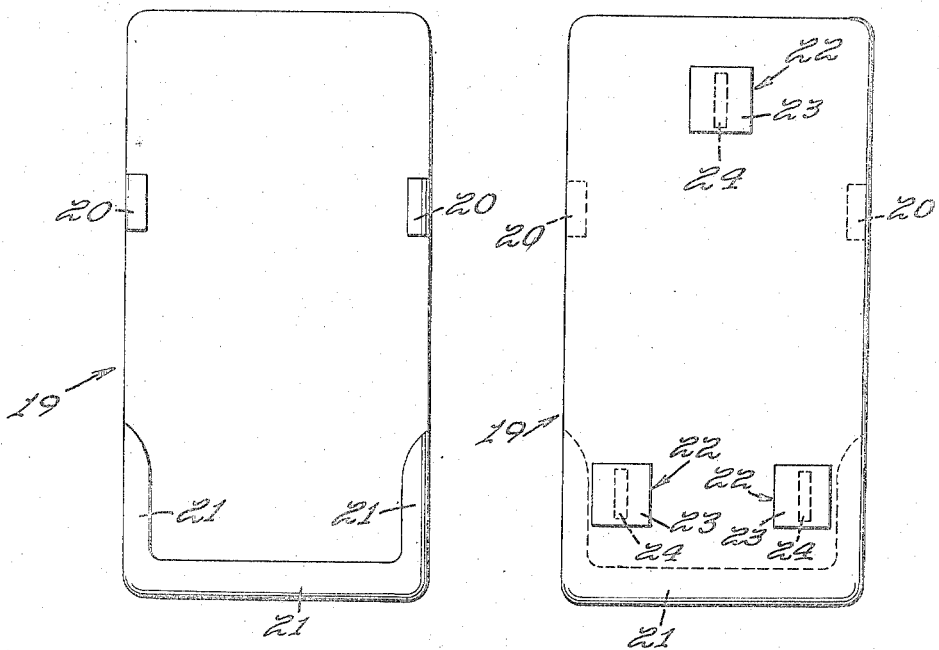
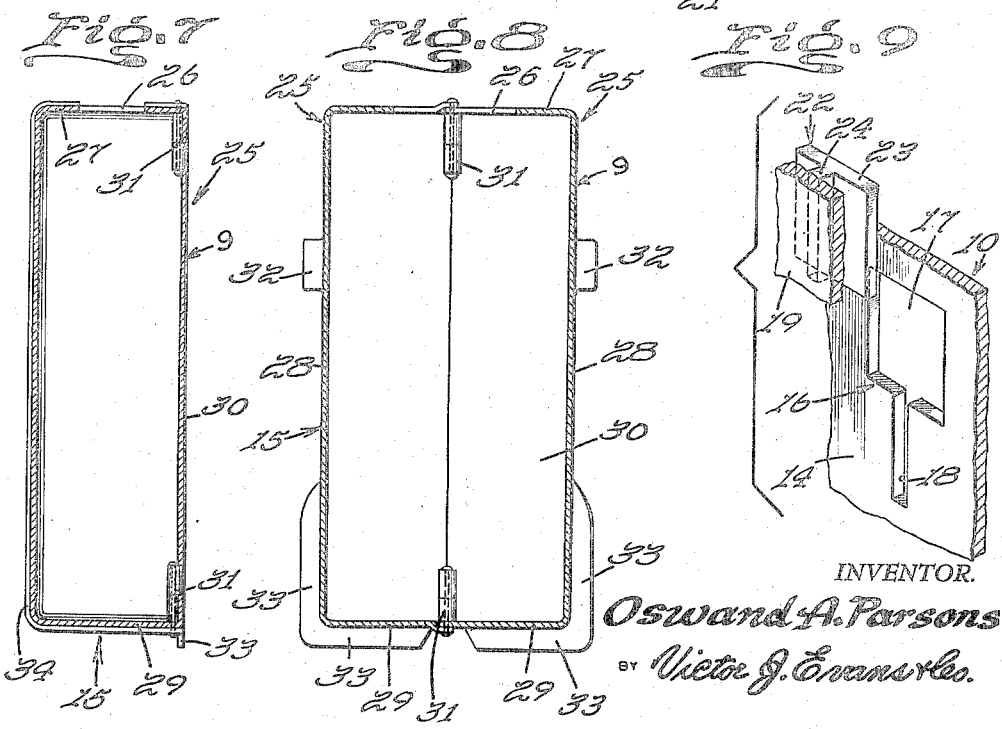
INVENTOR.
Oswand A. Parsons
BY Victor J. Evans & Co.
ATTORNEYS United States Patent Office 2,832,498
Patented Apr. 29, 1958

2,832,498
RECEPTACLE

Oswand A. Parsons, Billings, Mont.

Application January 26, 1955, Serial No. 484,158

2 Claims. (Cl. 220—18)

This invention relates to a receptacle or containers, and more particularly to a receptacle that is adapted to be mounted in a vehicle.

The object of the invention is to provide a receptacle or container for mounting in a vehicle such as an automobile or truck, whereby occupants of the vehicle can place used papers or other trash or disposable material in the container so that such trash or papers will not be necessarily thrown out the window of the vehicle to clutter or litter the streets and make the countryside unsightly.

Another object of the invention is to provide a container which is adapted to be mounted in a vehicle such as an automobile whereby the container is in easy reach of the occupants of the vehicle so that paper which is to be discarded or other material can be placed in the container whereby such waste material will not be thrown out the windows of the vehicle and thereby litter the streets or countryside, the container adapted to be emptied after it is filled or when a convenient place is found for emptying the receptacle.

A further object of the invention is to provide a vehicle container or receptacle which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view illustrating the front portion of the vehicle inside the vehicle, and illustrating the container of the present invention mounted therein.

Figure 2 is a front elevational view of the container or receptacle.

Figure 3 is a top plan view of the container and showing the vehicle panel or wall in section.

Figure 4 is a sectional view taken on the line 4—4 of Figure 2.

Figure 5 is a front elevational view of the hanger plate.

Figure 6 is a rear elevational view of the plate of Figure 5.

Figure 7 is a sectional view taken on the line 7—7 of Figure 2 and showing the housing detached from the plate.

Figure 8 is a vertical sectional view taken at right angles to the view shown in Figure 7.

Figure 9 is a fragmentary perspective view, with parts broken away and in section, illustrating the connection means between the plate and panel.

Figure 10 is a sectional view taken on the line 10—10 of Figure 2.

Referring in detail to the drawings, the numeral 10 designates a portion of a conventional vehicle such as an automobile, Figure 1, and the vehicle 10 includes the usual front door 11, front windshield 12 and inside panel or wall 14. The numeral 15 designates generally the receptacle or container which may be mounted conveniently in the front portion of the vehicle adjacent the panel 14, whereby trash or papers can be stuffed into the receptacle 15 instead of throwing such trash out the window to clutter up the streets or countryside.

The panel 14 of the vehicle is provided with three cutouts 16, Figure 9. Each of the cutouts 16 may have the same construction and each includes an upper, enlarged rectangular portion 17 and a lower narrow slitted portion 18. Arranged contiguous to the outer surface of the panel 14 and detachably connected thereto is a hanger plate 19, Figures 5 and 6. The plate 19 may have a rectangular shape and has a pair of clamps 20 extending outwardly therefrom, the clamps 20 defining tapered recesses therein, Figure 10 for a purpose to be later described. The plate 19 is further provided with a flange 21 which extends outwardly from the lower edge thereof, and a portion of the flange 21 extends up along each side edge thereof.

A means is provided for detachably connecting the plate 19 to the panel 14, and this means comprises three brackets which are each indicated by the numeral 22, Figures 6 and 9. It is to be noted from Figure 6 that the brackets 22 are arranged adjacent the rear of the plate 19, there being one of the brackets 22 adjacent the upper portion of the plate 19 and two of the brackets 22 adjacent the lower portion thereof. Each bracket 22 includes a rectangular base 23 which is interconnected with the main portion of the plate 19 by means of a bar 24. Thus, the base 23 can be inserted through the upper portion 17 of the cutout 16, and then the bar 24 will slip through the lower portion 18 of the cutout so that the plate 19 will be retained connected to the panel 14. However, by raising the plate the bases 23 can be brought into registry with the portions 17 of the cutouts so that the plate can be removed if desired from the panel.

The present invention further includes a hollow housing 9 which comprises a pair of similar sections 25 that are hingedly connected together by means of hinges 31. The housing 9 is provided with an opening 26 in the top thereof whereby papers or other trash can be stuffed into the container. The sections 25 include top walls 27, a side wall 28, bottom wall 29 and back wall 30 which is arranged contiguous to the plate 19. Extending outwardly from the sides of the sections are a pair of wedge shaped lugs 32 which are adapted to fit in or engage the clamps 20. Extending from the lower portion of the housing are lips 33 which are snugly received in the flange 21 when the parts are assembled.

One of the sections 25 of the housing is provided on its free edge with an outwardly offset portion 34 which receives the adjacent edge of the other section so as to form a tight seal or joint between the sections when the sections are in their closed position, Figure 4. The front walls of the sections 25 are indicated by the numeral 35.

From the foregoing it is apparent that there has been provided a container or receptacle which is adapted to be mounted in a vehicle such as the vehicle 10, and the container 15 can be used for receiving trash or paper which would ordinarily be thrown out the window. In use the waste papers are inserted into the opening 26 in the top of the container and then after the vehicle reaches its destination or after trash cans are located, the housing can be readily removed from the plate 19 by pushing or lifting the housing up so that the lugs 32 move out of engagement with the clamps 20 and the lips 33 move up out of engagement from the flange 21. Then, the housing can be readily removed and the sections 25 swung open about the hinges 31 so that the trash or contents of the housing can be readily emptied into a large container or the like. Then, the housing is readily replaced on the plate 19 so that it can be again used for receiving trash or the like. The plate 19 is detachably connected to the panel 14 through the medium of the brackets 22 which extend through the cutouts 16 and if desired the plate 19 can be also removed by disengaging the brackets 22 from the cutouts. The wedge shaped lugs 32 which engage the clamps 20 help to insure that there will be a tight fit between the parts.

The base 23 of each bracket is spaced sufficiently from the plate 19 to permit the bracket to pass through the enlarged portion 17 of the cut out so that the bars 24 can then slide down through the portion 18. The panel 14 in the vehicle is usually made of a thin cardboard like material and the construction is such that the receptacle will be readily suspended thereon. The brackets 22 are spaced so that they will not show when the parts are assembled as shown in Figure 1.

The present invention will permit disposal of paper products and other items in a convenient manner so that the beauty of the countryside will be preserved. Also, papers or other trash can be readily disposed of by passengers in automobiles and trucks during travel. The parts can be made of any suitable material and of any desired size. The container is preferably attached to the inside of the vehicle just in front of the right front door as shown in Figure 1. The hanger plate 19 extends above the sections 25 of the housing so that pressure can be simultaneously applied on the bottom of the housing and on the top of the plate when the parts are to be disassembled.

It will be seen that there has been provided a device which will improve or save the views of scenery and the like. During the past season, the National Park Service issued paper bags to tourists in national parks by means of which they could dispose of papers and other items and keep the trash from cluttering up the scenery. Unsightly papers have given the National Park Service and others considerable worry because of the great expanse of territory which cannot be gone over to retrieve the scraps of papers and other items. The paper bags are certainly an inconvenient and unsatisfactory means of coping with the problem. The "Scenic-View Saver" or the present invention provides a permanent installation for solving such waste paper problems at all times for any organization interested in preserving the scenic beauty and well kept appearance of an area whether it be in national, state or local parks, along turnpikes, or national state and local highways, or city streets.

I claim:

1. In a trash receptacle for a vehicle, a rectangular plate having three brackets extending rearwardly therefrom, each of said brackets including a rectangular base spaced from said plate, a bar arranged intermediate the ends of said base and extending between said base and plate, a hollow housing arranged contiguous to the outer surface of said plate, and interengaging means releasably connecting said housing to said plate, said interengaging means comprising a pair of clamps extending from the outer side edges of said plate and defining therein a tapered recess, a flange extending along the bottom edge of said plate and extending up the side edges of said plate for a portion of their length, said housing including a pair of wedge-shaped lugs adapted to engage the recesses in said clamps, said wedge-shaped lugs serving to insure that there will be a tight fit between the parts, lips on the bottom of said housing for engagement with said flange, said housing including a pair of sections mounted for movement into and out of opening and closing relation with respect to each other, and said housing including a top wall provided with an opening therein, hinges interconnecting said sections together, each of said sections including a side wall, front and back walls, and a bottom wall, an edge of one of said sections being provided with an enlarged offset portion for engagement with the meeting edge of the other section, said plate being larger than said housing, one of said brackets being arranged adjacent to the top of said plate and the other two brackets being arranged adjacent to the lower end of said plate, said plate extending above the sections of the housings so that pressure can be simultaneously applied on the bottom of the housing and on top of the plate when the parts are to be disassembled.

2. In a trash receptacle for a vehicle, a plate having a plurality of brackets extending rearwardly therefrom, each of said brackets including a base spaced from said plate, a bar extending between said base and plate, a hollow housing arranged contiguous to the outer surface of said plate, interengaging means releasably connecting said housing to said plate, said interengaging means comprising a pair of clamps extending from said plate and defining therein a recess, a flange extending along the bottom edge of said plate and extending up the side edges of said plate for a portion of their length, said housing including a pair of lugs adapted to engage the recesses in said clamps, said lugs serving to insure that there will be a tight fit between the parts, lips on said housing for engagement with said flange, said housing including a pair of sections mounted for movement into and out of opening and closing relation with respect to each other, and said housing including a top wall provided with an opening therein, hinges interconnecting said sections together, each of said sections including a side wall, front and back walls, and a bottom wall, one of said brackets being arranged adjacent to the top of said plate and the other bracket being arranged adjacent to the lower end of said plate, said plate extending above the sections of the housings so that pressure can be simultaneously applied on the bottom of the housing and on top of the plate when the parts are to be disassembled.

References Cited in the file of this patent

UNITED STATES PATENTS

| 1,156,370 | Pomeroy | Oct. 12, 1915 |
| 1,455,549 | Robison | May 15, 1923 |
| 1,502,180 | Dever | July 22, 1924 |
| 1,661,188 | Matthews | Mar. 6, 1928 |
| 1,720,309 | Wakefield | July 9, 1929 |
| 1,951,196 | Meadows et al. | Mar. 13, 1934 |
| 1,974,073 | Kimball | Sept. 18, 1934 |
| 2,013,852 | Odendahl | Sept. 10, 1935 |
| 2,029,089 | Weirauch | Jan. 28, 1936 |
| 2,310,390 | Bridges et al | Feb. 9, 1943 |
| 2,623,669 | Hoover | Dec. 30, 1952 |
| 2,636,633 | Carlson | Apr. 28, 1953 |
| 2,743,075 | Johnson | Apr. 24, 1956 |

FOREIGN PATENTS

| 351,843 | Great Britain | July 2, 1931 |